United States Patent
Welinder et al.

(10) Patent No.: US 9,292,756 B2
(45) Date of Patent: Mar. 22, 2016

(54) SYSTEMS AND METHODS FOR AUTOMATED IMAGE CROPPING

(71) Applicant: Dropbox, Inc., San Francisco, CA (US)

(72) Inventors: Nils Peter Welinder, San Francisco, CA (US); Szu-Po Wang, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 14/102,477

(22) Filed: Dec. 10, 2013

(65) Prior Publication Data

US 2015/0161466 A1   Jun. 11, 2015

(51) Int. Cl.
 *G06K 9/46* (2006.01)
 *G06K 9/32* (2006.01)
 *G06K 9/00* (2006.01)

(52) U.S. Cl.
 CPC .......... *G06K 9/3233* (2013.01); *G06K 9/00979* (2013.01)

(58) Field of Classification Search
 None
 See application file for complete search history.

(56) References Cited

U.S. PATENT DOCUMENTS

| | | | |
|---|---|---|---|
| 5,978,519 A | 11/1999 | Bollman et al. | |
| 8,363,984 B1 * | 1/2013 | Goldman | 382/298 |
| 8,577,182 B1 * | 11/2013 | Goldman | 382/298 |
| 2002/0089516 A1 | 7/2002 | Sobol | |
| 2002/0191861 A1 * | 12/2002 | Cheatle | 382/282 |
| 2005/0007382 A1 | 1/2005 | Schowtka | |
| 2007/0076979 A1 | 4/2007 | Zhang et al. | |
| 2008/0181512 A1 * | 7/2008 | Gavin et al. | 382/209 |
| 2010/0128986 A1 | 5/2010 | Xu | |
| 2010/0266208 A1 * | 10/2010 | Downing et al. | 382/195 |
| 2010/0329588 A1 * | 12/2010 | Cheatle | 382/298 |
| 2011/0069085 A1 | 3/2011 | Weber et al. | |
| 2014/0176612 A1 * | 6/2014 | Tamura et al. | 345/660 |

OTHER PUBLICATIONS

EXIF wiki article, last accessed Apr. 30, 2015 (http://en.wikipedia.org/wiki/Exchangeable_image_file_format).*
Cropp.me, Retrieved on Dec. 11, 2013, from http://cropp.me/, 2 pgs.
Croppola.com, Retrieved on Dec. 10, 2013, from http://croppola.com/ and http://croppola.com/about/, 3pgs.

(Continued)

*Primary Examiner* — Nirav G Patel
*Assistant Examiner* — Narek Zohrabyan
(74) *Attorney, Agent, or Firm* — KPPB LLP

(57) ABSTRACT

Systems and methods in accordance with embodiments of the invention automatically crop images based upon the location of one or more regions of interest (ROIs) identified within the cropped image. In one embodiment, an image cropping application configures a processor to utilize at least one object detector to identify at least one region of interest within an image. A plurality of candidate cropped images within the image are selected and for each candidate cropped image, an output is generated by weighting each of the at least one region of interest contained within the candidate cropped image as a function of its position within the candidate cropped image. A crop location can then be selected based upon the candidate cropped image having the largest output.

19 Claims, 12 Drawing Sheets

(56) References Cited

OTHER PUBLICATIONS

Viola et al., "Robust Real-Time Face Detection", IJCV, 2004, Printed from: http://www.vision.caltech.edu/html-files/EE148-2005-Spring/pprs/viola04ijcv.pdf.

Viola et al., "Robust Real-time Object Detection", Cambridge Research Laboratory, Technical Report Series, Compaq, CRL Jan. 2001, Feb. 2001, Printed from: http://www.hpl.hp.com/techreports/Compaq-DEC/CRL-2001-1.pdf, 30 pgs.

* cited by examiner

SYSTEMS AND METHODS FOR AUTOMATED IMAGE CROPPING

FIELD OF THE INVENTION

The present invention relates generally to image cropping and more specifically to the automated cropping of images based upon the location of regions of interest within the images.

BACKGROUND

There are many circumstances in which a software application can display one or more digital images. In many instances, an application may only need a portion of an image. For example, the application may be configured to display a thumbnail image instead of a full high-quality image. Instead of using a thumbnail that is simply a smaller version of the full high-quality image, an application may instead display a cropped portion of the full high-quality image. A simple heuristic such as cropping based upon the location of the center of an image can result in a cropped image that does not contain one or more important visual elements from the image.

SUMMARY OF THE INVENTION

Systems and methods in accordance with embodiments of the invention automatically crop images based upon the location of one or more regions of interest (ROIs) identified within the cropped image. One embodiment of the invention includes a processor, and a memory connected to the processor, where the memory contains: an image cropping application; and an image file containing image data encoding an original image. In addition, the image cropping application configures the processor to: utilize at least one object detector to identify at least one region of interest within the original image; select a plurality of candidate cropped images within the original image; for each candidate cropped image, generate an output by weighting each of the at least one region of interest contained within the candidate cropped image as a function of its position within the candidate cropped image; select a crop location within the original image based upon the candidate cropped image having the largest output; and generate cropped image metadata.

In a further embodiment, the image cropping application configures the processor to generate an output by weighting each of the at least one region of interest contained within a candidate cropped image as a function of its position within the candidate cropped image by convolving a cropping kernel positioned in a candidate crop location with the at least one region of interest contained within the candidate cropped image.

In another embodiment, the image cropping application further configures the processor to utilize the at least one object detector to obtain at least one confidence metric associated with each of the at least one region of interest.

In a still further embodiment, the image cropping application further configures the processor to filter the at least one region of interest identified by the at least one object detector based upon the at least one confidence metric.

In still another embodiment, the image cropping application further configures the processor to convolve a cropping kernel positioned in a candidate crop location with the at least one region of interest contained within the candidate cropped image by weighting the convolution of the cropping kernel with a given region of interest by the at least one confidence metric associated with the given region of interest.

In a yet further embodiment, the image cropping application further configures the processor to rescale the at least one confidence metric associated with each of the at least one region of interest.

In yet another embodiment, the image cropping application further configures the processor to convolve each of a plurality of cropping kernels positioned in a candidate crop location with the at least one region of interest contained within the candidate cropped image to generate a plurality of outputs with respect to the candidate cropped image, where the plurality of cropping kernels weight a given region interest as a function of its position within the candidate cropped image using different weighting functions.

In a further embodiment again, the image cropping application further configures the processor to select a subset of a plurality of cropping kernels based upon the at least one region of interest identified within the image.

In another embodiment again, at least two of the candidate cropped images have different dimensions, and the image cropping application further configures the processor to select the dimensions of the candidate cropped image that results in the largest output as the dimensions of a cropped image.

In a further additional embodiment, the cropped image metadata includes an image crop location.

In another additional embodiment, the cropped image metadata further includes cropped image dimensions.

In a still yet further embodiment, the image cropping application further configures the processor to generate a cropped image from the original image based upon the crop location and dimensions of the cropping kernel and the cropped image metadata includes the cropped image.

In still yet another embodiment, the image cropping application further configures the processor to insert the cropped image metadata inside the image file.

In a still further embodiment again, the image processing system is part of an image capture device that further includes a camera and a network interface, and the image cropping application is part of a client application that configures the processor to share the image file and the cropped image metadata with a synchronized content management system via the network interface.

In still another embodiment again, the image processing system is part of a synchronized content management system further including a network interface, and the image cropping application is part of a server application that configures the processor to automatically share at least one of the image file and the cropped image metadata with at least one authorized computing device via the network interface.

In a still further additional embodiment, the image cropping application further configures the processor to utilize at least one object detector to obtain at least one importance weighting associated with each of the at least one region of interest.

In still another additional embodiment, the image cropping application configures the processor to weight each of the at least one region of interest contained within a candidate cropped image as a function of its position within the candidate cropped image by convolving a cropping kernel positioned in a candidate crop location with the at least one region of interest contained within the candidate cropped image, where the convolution of the cropping kernel with a given region of interest is weighted by the at least one importance weighting associated with the given region of interest.

In a yet further embodiment again, the image cropping application further configures the processor to: utilize at least one object detector to obtain at least one confidence metric associated with each of the at least one region of interest; rescale the at least one confidence metric associated with each of the at least one region of interest; filter the at least one region of interest identified by the at least one object detector based upon the rescaled at least one confidence metric; and weight each of the at least one region of interest contained within a candidate cropped image as a function of its position within the candidate cropped image by convolving a cropping kernel positioned in a candidate crop location with the at least one region of interest contained within the candidate cropped image, where the convolution of the cropping kernel with a given region of interest is weighted by the rescaled at least one confidence metric associated with the given region of interest. In addition, the cropped image metadata is selected from a group including: an image crop location; cropped image dimensions; and a cropped image.

In yet another embodiment again, the image cropping application further configures the processor to: utilize the at least one object detector to obtain at least one confidence metric associated with each of the at least one region of interest; and weight each of the at least one region of interest contained within a candidate cropped image as a function of its position within the candidate cropped image by further weighting a given region of interest from the at least one region of interest by the at least one confidence metric associated with the given region of interest.

Another further embodiment includes a processor and a memory connected to the processor, where the memory contains: an image cropping application; and an image file containing image data encoding an image. In addition, the image cropping application configures the processor to: utilize at least one object detector to identify at least one region of interest within the image; select a plurality of candidate crop locations within the image; convolve a cropping kernel positioned in each of the candidate crop locations with the at least one region of interest to generate a convolution output with respect to each candidate crop location, where the cropping kernel weights a given region of interest as a function of its location relative to a candidate crop location; select the candidate crop location with the largest convolution output as the location in which to crop the image; and generate cropped image metadata.

An embodiment of the method of the invention includes: identifying at least one region of interest within an image using a processor configured by an image cropping application; selecting a plurality of candidate cropped images within the image using the processor configured by the image cropping application; for each candidate cropped image, generating an output by weighting each of the at least one region of interest contained within the candidate cropped image as a function of its position within the candidate cropped image using the processor configured by the image cropping application; selecting a crop location within the image based upon the candidate cropped image having the largest output using the processor configured by the image cropping application; and generating cropped image metadata using the processor configured by the image cropping application.

Another embodiment of the method of the invention includes: receiving an image file containing image data encoding an original image from an authorized computing device at a synchronized CMS server system; storing the received image file within the synchronized CMS server system; identifying at least one region of interest within the original image using a processor within the synchronized CMS server system configured by an image cropping application; selecting a plurality of candidate cropped images within the original image using a processor within the synchronized CMS server system configured by an image cropping application; for each candidate cropped image, generating an output by weighting each of the at least one region of interest contained within the candidate cropped image as a function of its position within the candidate cropped image using a processor within the synchronized CMS server system configured by an image cropping application; selecting a crop location within the original image based upon the candidate cropped image having the largest output using a processor within the synchronized CMS server system configured by an image cropping application; and generating cropped image metadata using a processor within the synchronized CMS server system configured by an image cropping application; and sharing the image file and cropped image metadata with at least one authorized computing device using a processor within the synchronized CMS server system configured by a content sharing application.

A further embodiment of the method of the invention includes: identifying at least one region of interest within an image using a processor configured by an image cropping application; selecting a plurality of candidate crop locations within the image using the processor configured by the image cropping application; convolving a cropping kernel positioned in each of the candidate crop locations with the at least one region of interest to generate a convolution output with respect to each candidate crop location using the processor configured by the image cropping application, where the cropping kernel weights a given region of interest as a function of its location relative to a candidate crop location; selecting the candidate crop location with the largest convolution output as the location in which to crop the image using the processor configured by the image cropping application; and generating cropped image metadata using the processor configured by the image cropping application.

Another further embodiment of the method of the invention includes: receiving an image at a synchronized content management system server system; storing the received image within the synchronized content management system server system; identifying at least one region of interest within the image using a processor within the synchronized content management system server system configured by an image cropping application; selecting a plurality of candidate crop locations within the image using a processor within the synchronized content management system server system configured by an image cropping application; convolving a cropping kernel positioned in each of the candidate crop locations with the at least one region of interest to generate a convolution output with respect to each candidate crop location using a processor within the synchronized content management system server system configured by an image cropping application, where the cropping kernel weights a given region of interest as a function of its location relative to a candidate crop location; selecting the candidate crop location with the largest convolution output as the location in which to crop the image using a processor within the synchronized content management system server system configured by an image cropping application; and generating cropped image metadata using a processor within the synchronized content management system server system configured by an image cropping application.

DETAILED DESCRIPTION

Figure 1:
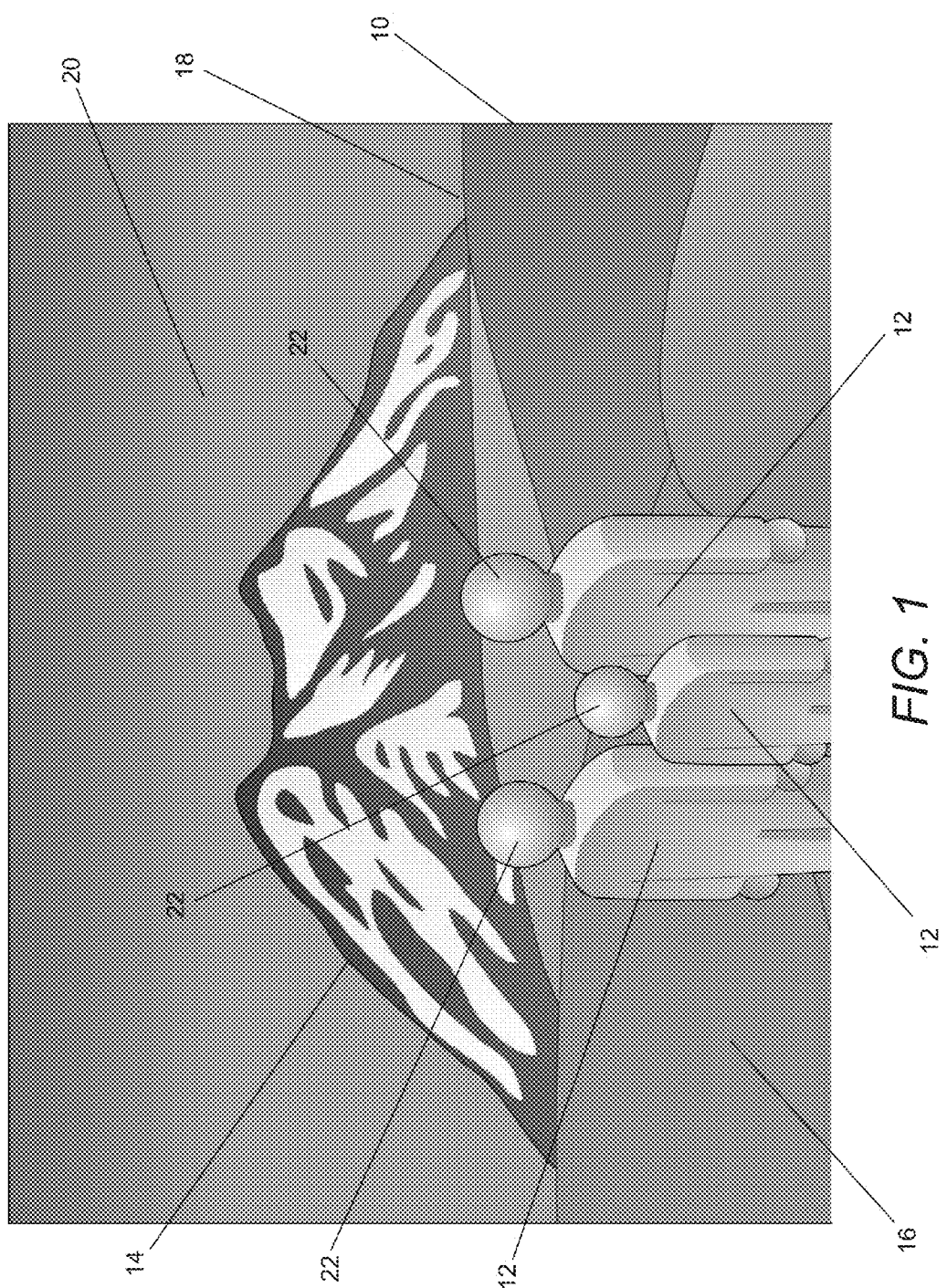
FIG. 1 conceptually illustrates an image containing a cluster of people in the foreground of the image and scenery in the background of the image.

Turning now to the drawings, systems and methods for automated cropping of an image based upon the location of one or more regions of interest (ROIs) identified within the image are illustrated. Images typically involve a composition of visual elements that may be of different levels of interest to a viewer. In several embodiments, object detectors are utilized to identify regions of interest (ROIs) within the image that are then used to determine the manner in which to crop the image. In many embodiments, a crop location is determined by weighting the ROIs based upon their positions relative to various candidate crop locations. In a number of embodiments, the weighting of the ROIs is implemented by convolving the ROIs with a cropping kernel. The candidate crop location at which the convolution yields the highest output can be selected as the location at which to crop the image. Although much of the discussion that follows discusses the weighting of ROIs through convolution using a cropping kernel (which can be computationally efficient), any of a variety of processes can be utilized to weight ROIs based upon their positions relative to various candidate crop locations including (but not limited to) the use of look up tables, using a classifier that selects cropping locations based upon the locations of ROIs, and/or using a regressor process. In certain embodiments, the object detectors output one or more confidence metrics to indicate the confidence with which a particular object is detected and the confidence metrics can be utilized to apply confidence weightings to the ROIs in an image. In a number of embodiments, weightings are also assigned to ROIs based upon the importance of specific types of visual elements within a composition (e.g. faces can be weighted as more important than a horizon line).

Cropping processes in accordance with many embodiments of the invention can be implemented in the context of synchronized content management systems (CMSs), such as the Dropbox® service provided by Dropbox, Inc. of San Francisco, Calif. Synchronized CMSs can be utilized to synchronize content between multiple computing devices that are configured via client applications to communicate with the synchronized CMSs. In several embodiments, the client applications configure the computing devices to display user interfaces containing thumbnails of images contained within image files shared via the synchronized CMSs. In a number of embodiments, the thumbnail images are cropped images generated from the images contained within the shared image files using an automated cropping process similar to any of the processes described above. In many embodiments, the automated cropping process is performed by a synchronized CMS and the cropped image metadata is distributed to the user devices to which the image files have been distributed via the synchronized CMS. Cropped image metadata can include a cropped image and/or metadata describing a crop location and/or the dimensions of the cropped image. In certain embodiments, the client application resident on the image capture device performs the automated cropping process and distributes an image file and corresponding cropped image metadata to the synchronized content management system for distribution to other user devices. In several embodiments, cropped image metadata can be inserted within an image file and/or provided in a separate metadata file utilized by the client application in the generation of user interface displays. Accordingly, the implementation of automated cropping processes in accordance with embodiments of the invention within a synchronized CMS can involve the allocation of processes between image capture devices, and different servers within a server system. Furthermore, depending upon the nature of the cropped image metadata, the actual cropping of an image may not occur until some time after the crop location and/or dimensions of the crop are determined and a different computing device may actually perform the crop.

Systems and methods for automatically cropping images by identifying ROIs and determining one or more crop locations by weighting the locations, confidence, and/or importance of the identified ROIs in accordance with embodiments of the invention are discussed further below.

Image Composition

Images typically involve a composition of visual elements. Understanding the significance of individual visual elements becomes more difficult as the number of visual elements included in a composition increases. Processes for automatically cropping images typically involve decisions concerning the visual elements to include within the crop and/or the extent to which an individual visual element should be centered within the cropped image. A simple composition, such as a close up of the face of an individual, can be cropped so that the main visual element is centered within the cropped image. An image that includes a more complex composition of visual elements is shown in FIG. 1. Image 10 includes a cluster of three people 12 standing in the foreground of the image. Mountain 14 is located in the background of the image behind the cluster of people 12. Rolling hills 16 extend from the cluster of people to mountain 14 and form horizon line 18 with sky 20. The importance of specific visual elements typically varies from one viewer to the next. As a generalization, however, the faces 22 of people 12 in image 10 are likely to be considered the most important visual elements of the composition. Other visual elements, such as mountain 14 and horizon line 18, can be ascribed lower levels of visual importance and/or ignored for the purpose of cropping the image. As is discussed further below, cropping an image including a complex composition of visual elements such as image 10 shown in FIG. 1 can be challenging.

Figure 2A:
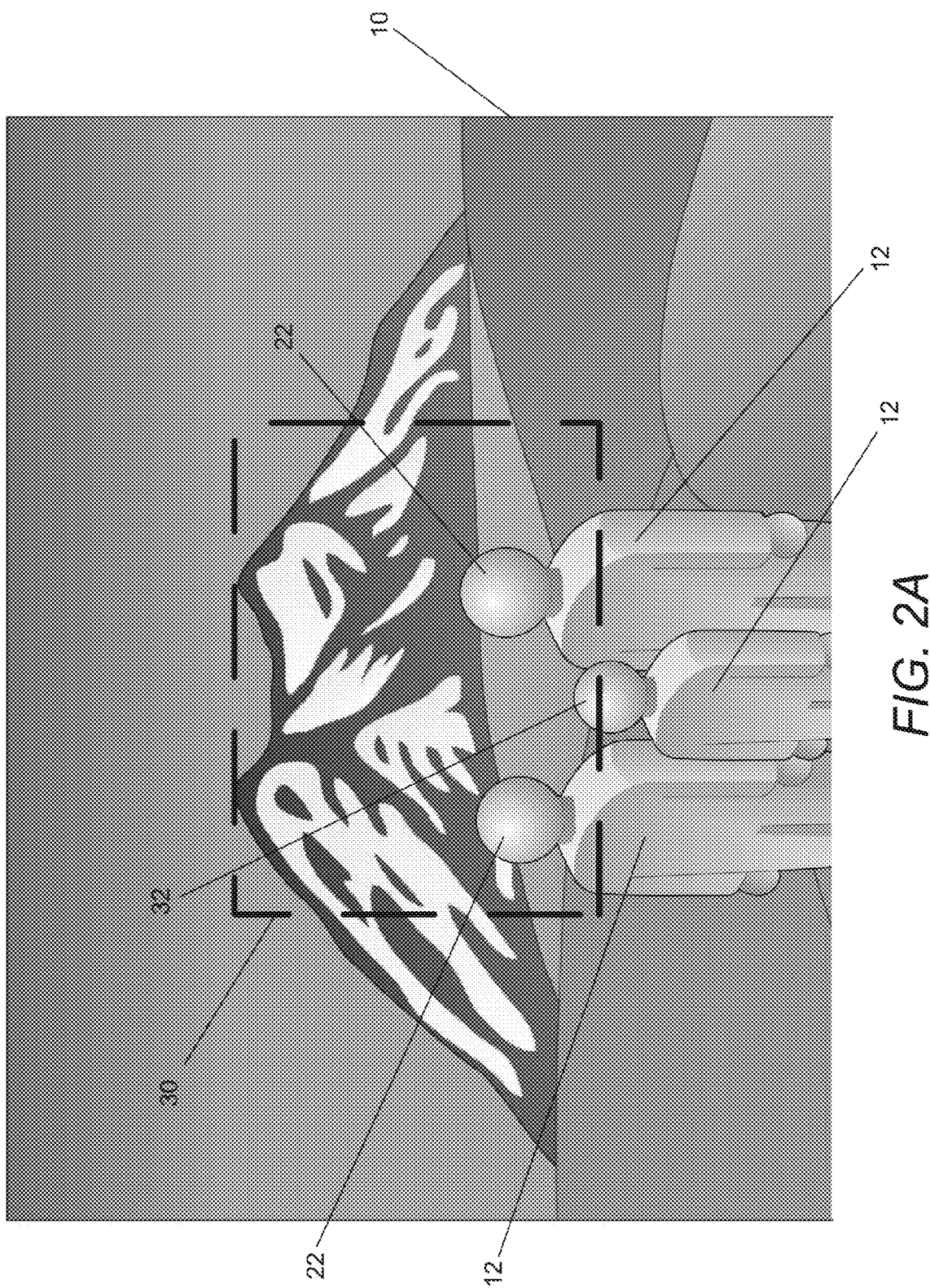
FIG. 2A conceptually illustrates cropping the image shown in FIG. 1 by performing a crop centered on the center of the image.

Many automated cropping processes utilize simple heuristics that assume that important visual elements in an image are located at the center of the image. A crop of image 10 shown in FIG. 1 centered on the center of the image is shown in FIG. 2A. As can readily be appreciated, the outline of crop 30 includes the faces 22 of two of the cluster of three people 12. Face 32 of the third person is only partially contained within the cropped image.

Figure 2B:
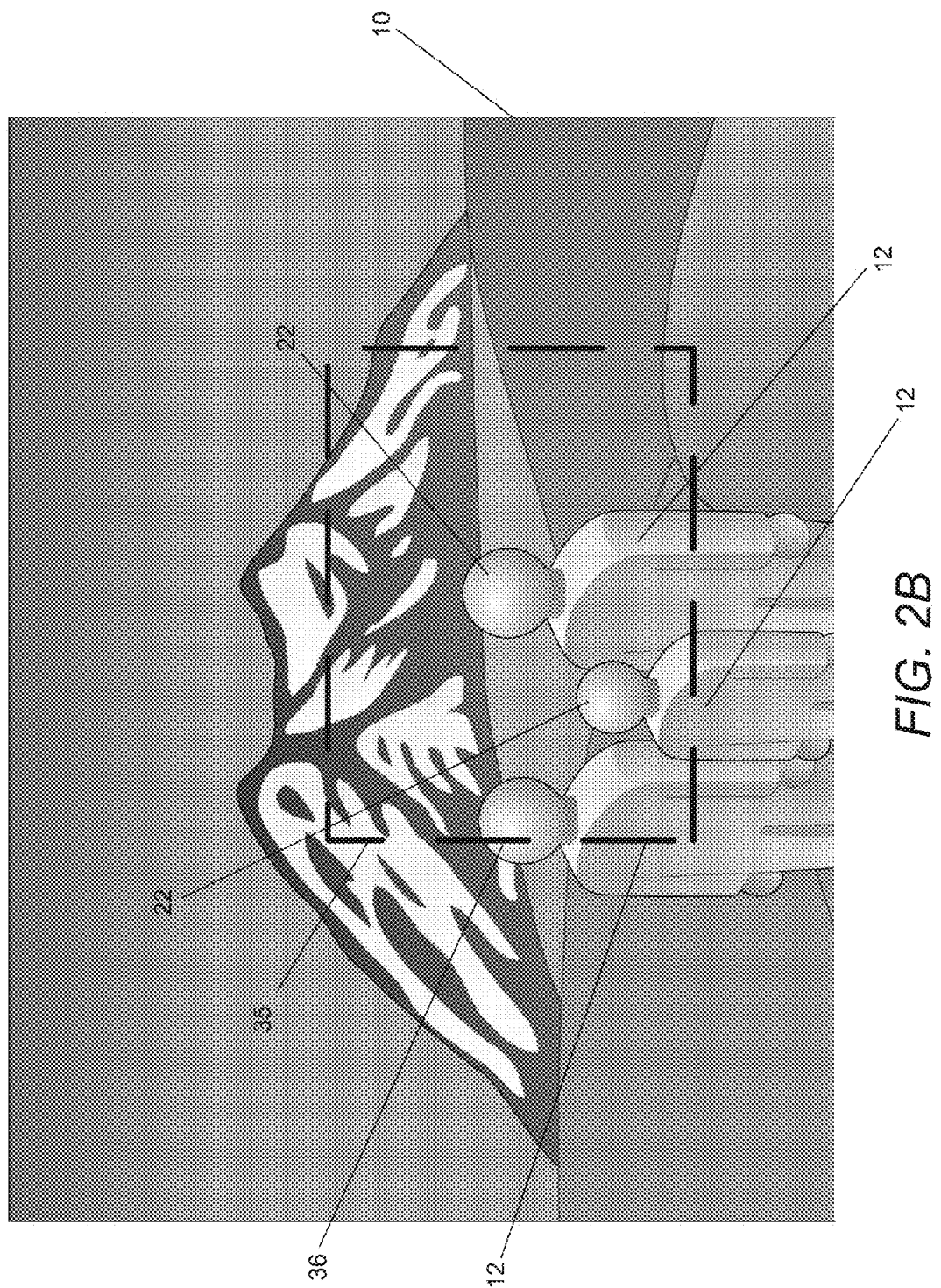
FIG. 2B conceptually illustrates cropping the image shown in FIG. 1 by performing a crop centered on the largest face detected in the image.

Computer vision techniques can be utilized to build object detectors that can identify all of the visual elements illustrated in FIG. 1. As noted above, faces are generally regarded as being significant visual elements when present in a composition. A face detector can be utilized to identify faces in image 10. An automated cropping process can be implemented in which the crop is centered on the largest face detected within an image. A crop of image 10 shown in FIG. 1 centered on the largest face present in the image is shown in FIG. 2B. As can readily be appreciated, the outline of crop 35 includes the faces 22 of two of the cluster of three people 12. Face 36 of the third person is only partially contained within the cropped image.

Ideally, an automated process for cropping images would crop image 10 so that the faces 22 of all three people 12 are contained within the cropped image. Assuming that faces are the most important visual elements in the composition, a cropped image containing all three faces 22 would contain all of the most important visual elements. Processes for identifying visual elements and selecting a crop location so that as many of the important visual elements as possible are contained within the cropped image in accordance with embodiments of the invention are discussed below.

Automated Cropping by Convolving ROIs with Cropping Kernels

Processes for automatically cropping images in accordance with many embodiments of the invention involve identifying ROIs within an image using object classifiers. A crop location can then be determined based upon the locations of the ROIs using a cropping kernel. The cropping kernel is a function that weights ROIs based upon their positions relative to the crop location. The weighting applied by the cropping kernel can impact the composition of the cropped image. In many embodiments, a cropping kernel is utilized that applies a greater weighting to ROIs located close to the center of a cropped image than the weighting applied to ROIs located near the edge of a cropped image. In several embodiments, the cropping kernel is a parabolic kernel. In a number of embodiments, the cropping kernel is a Gaussian kernel. In other embodiments, any of a variety of cropping kernels and/or techniques for weighting ROIs as a function of their positions within a candidate cropped image can be utilized that is likely to result in a desired composition of visual elements in a cropped image. In certain embodiments, a cropping kernel is selected from a set of cropping kernels based upon the number, location, and/or clustering of ROIs within an image. In this way, a cropping kernel is utilized that is likely to yield the most aesthetically pleasing composition in a cropped image given the visual elements present in the original image.

In many embodiments, the size and aspect ratio of a cropped image is predetermined. In several embodiments, the size and/or aspect ratio of a cropped image is determined based upon the visual elements present in the original image and/or selected as part of the process of determining the crop location. In a number of embodiments, ROIs within an image are convolved with cropping kernels having different sizes and/or aspect ratios and the cropping kernel that yields the highest convolution output is utilized to determine the crop location, and the dimensions of the cropped image. As can readily be appreciated, any of a variety of cropping kernels can be utilized in an automated cropping process in accordance with embodiments of the invention as appropriate to the requirements of specific applications.

Processes for automatically cropping images in accordance with several embodiments of the invention can also weight ROIs based upon a variety of additional metadata describing the ROIs including (but not limited to) the confidence with which an object detector detected the object contained within the ROI and/or the visual importance of the particular type of detected object. Object detectors utilized in a variety of computer vision applications are configured to analyze an input image and identify regions containing detected objects. In many instances, the object detectors also provide one or more confidence metrics that provide an indication of the reliability of the object detection. In a number of embodiments, automated processes for cropping images utilize confidence metrics to select crop locations. Weighting reliably detected visual elements higher than less reliably detected visual elements can increase the likelihood that the composition of the cropped image will include all of the important visual elements from the original image that can be contained within the cropped image. In embodiments where different object detectors are utilized, the confidence metrics can be normalized and/or rescaled to provide consistent weightings. The ROIs can be further weighted based upon the importance of specific categories of visual elements. For example, ROIs identified using a face detector can be weighted more heavily than ROIs detected using horizon detectors, water detectors, sky detectors, and/or any other type of detector that can be utilized to understand the visual elements present within an image.

In several embodiments, a single type of object detector is utilized to attempt to detect a primary type of visual element deemed most important (e.g. faces). In the event that the initial object detector is able to detect one or more ROIs that are likely to contain one of the primary visual elements, then the cropping kernel can be applied to the ROIs to determine the crop location and/or dimensions of the cropped image. In the event that the initial object detector cannot identify any ROIs that are likely to contain a primary visual element, then the automated process can apply a default crop, request user input, and/or utilize one or more additional object detectors to try and identify a secondary visual element that can be utilized to determine a crop location and/or size in the absence of a primary visual element.

Figure 3:
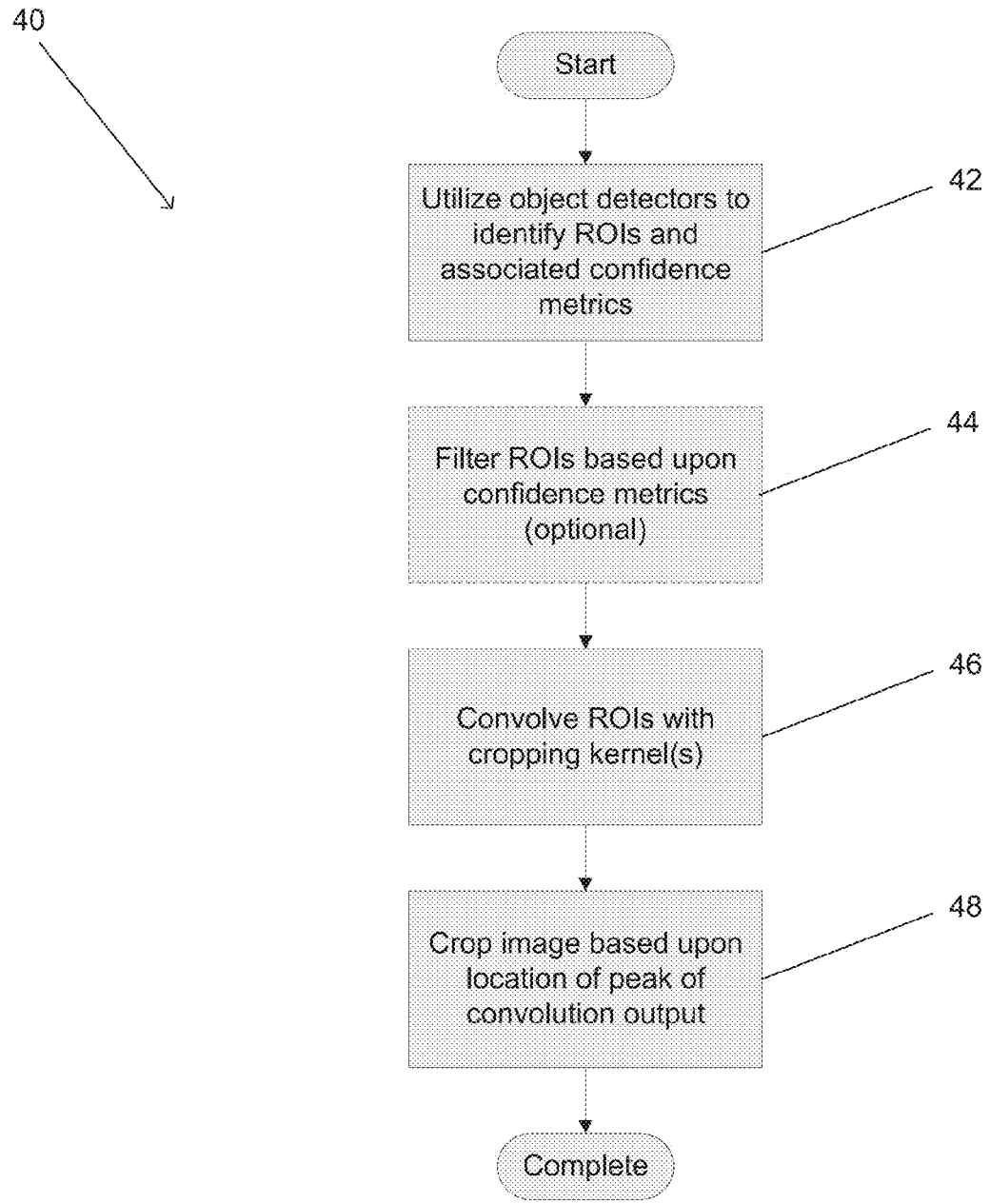
FIG. 3 is a flow chart showing a process for automatically cropping an image based upon the locations of regions of interest (ROIs) within the image in accordance with an embodiment of the invention.

A process that can be implemented on a computing device, such as (but not limited to) a mobile computing device, personal computer, or server system, to automatically crop an image by detecting ROIs using an object detector and then convolving the ROIs with one or more cropping kernels in accordance with an embodiment of the invention is shown in FIG. 3. The process 40 includes utilizing (42) object detectors to identify ROIs within the image that are likely to contain objects and to provide confidence metrics that are associated with each identified object. The detected ROIs can be optionally filtered (44) utilizing the confidence metrics. In several embodiments, the confidence metrics for the ROIs are rescaled and filtered using a predetermined threshold. In a number of embodiments, the object detector(s) output a variety of confidence metrics and different thresholds are applied to filter each (rescaled) metric.

Figure 4:
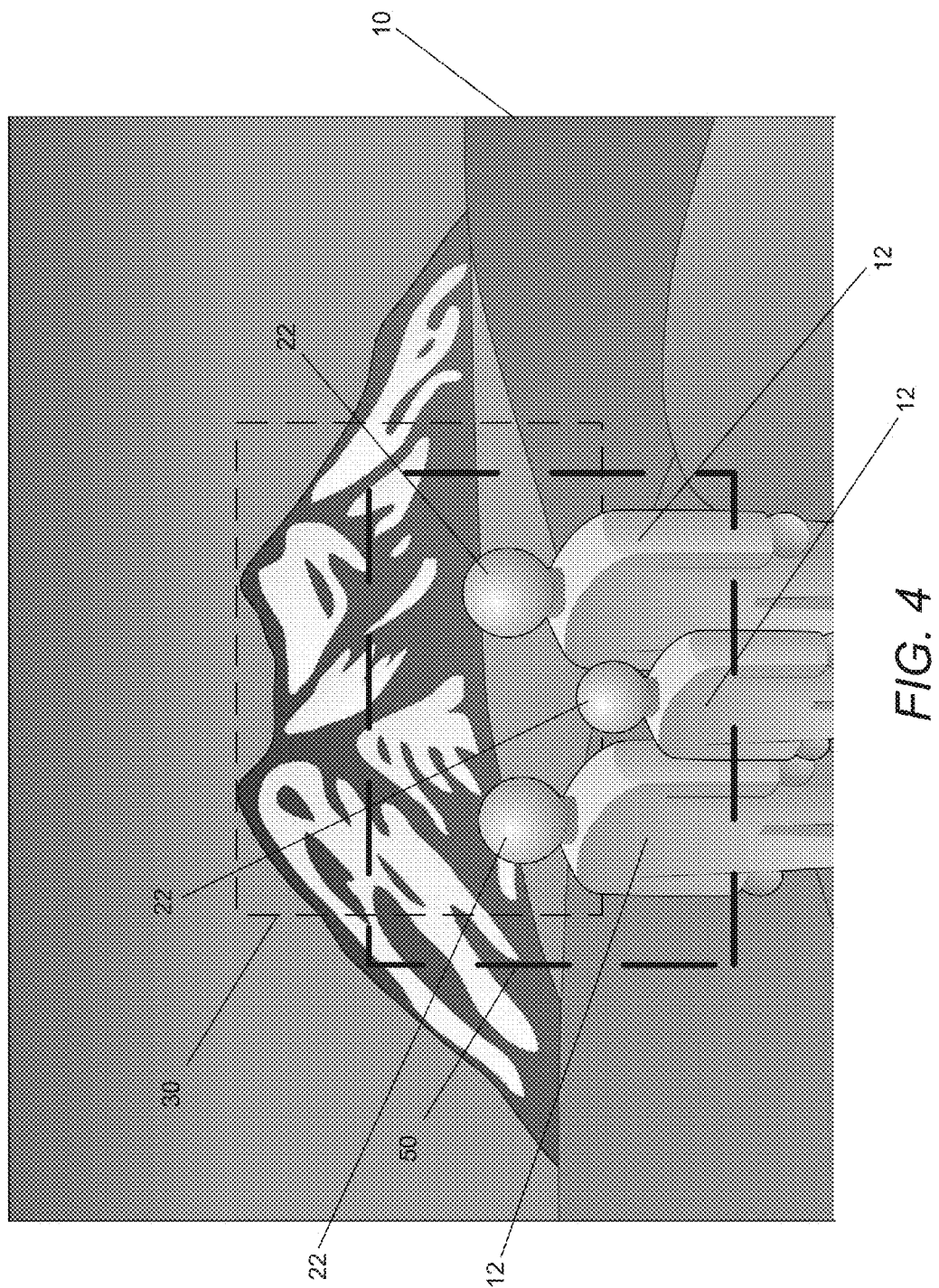
FIG. 4 conceptually illustrates the cropping of the image shown in FIG. 1 using a process for automatically cropping an image based upon the locations of regions of interest (ROIs) within the image in accordance with an embodiment of the invention.

A crop location and/or the dimensions of the cropped image can be determined by convolving (46) the ROIs with one or more cropping kernels centered at one of a number of candidate crop locations. The manner in which a candidate crop location is specified is arbitrary. In many embodiments, crop locations are specified as a pixel location or an offset within the image relative to a predetermined pixel location that identifies the portion of the image that is cropped. In several embodiments, the crop location is the upper left corner of the cropped region, but could equally be specified as any corner or the center of the cropped region. In several embodiments, where a single cropping kernel is utilized (i.e. the crop is a predetermined size and aspect ratio), the crop location is determined based upon the candidate crop location that yields the highest output of the convolution process. Where multiple cropping kernels are utilized that have different dimensions, the crop location and the dimensions of the cropped image are determined based upon the combination of candidate crop location and cropping kernel that yields the highest output of the convolution process. The image is then cropped (48) based upon the crop location and/or dimensions of the cropping kernel that yielded the highest output of the convolution process. The use of a process similar to process 40 described above with reference to FIG. 3 to crop image 10 shown in FIG. 1 is conceptually illustrated in FIG. 4. The crop location 50 includes the faces 22 of each of the three people 12 (in contrast to crop location 30 centered with respect to the image). As can readily be appreciated, the specific location of the crop largely depends upon the object detectors utilized to detect visual elements within image 10, the specific cropping kernel(s) convolved with the detected ROIs, and any additional weighting applied to the output of the convolution of the cropping kernel with individual ROIs based upon factors including (but not limited to) confidence metrics associated with the ROIs and/or importance weightings associated with the ROIs.

In many embodiments, the cropping kernel(s) utilized to perform the convolution are selected from a group of cropping kernels based upon factors including (but not limited to) the dimensions and/or aspect ratio of the original image, the resolution of the original image, and the locations and/or clustering of detected visual elements within the region of interest (e.g. a different cropping kernel is utilized for images in which an odd number of faces are detected compared to images in which an even number of faces are detected). The specific cropping kernel(s) utilized to perform a convolution with detected ROIs typically depends upon the requirements of a specific application.

In addition to or as an alternative to filtering ROIs based upon their associated confidence metrics, the convolution of the cropping kernel with individual ROIs can be weighted based upon the confidence metrics associated with the individual ROIs. Furthermore, the ROIs can also be weighted based upon the relative importance of the type of visual element that is believed to be located within the ROI. The relative weighting of the convolution of different ROIs with cropping kernels during the selection of a crop location in accordance with embodiments of the invention is discussed further below.

Although various computer implementable processes for automatically cropping images are described above with reference to FIG. 3, any of a variety of processes that select crop locations by detecting objects within an image and weighting ROIs containing detected objects by factors including (but not limited to) the position of the ROI relative to the crop location, the confidence with which each of the objects is detected, and/or the relative importance of each type of detected object can be utilized as appropriate to the requirements of specific applications in accordance with embodiments of the invention. Furthermore, the various processes described above with reference to FIG. 3 can be performed in alternative sequences and/or in parallel (on different computing devices) in order to achieve similar results in a manner that is more appropriate to the requirements of a specific application. Various implementations of automatic cropping processes in the context of synchronized content management systems in accordance with embodiments of the invention are discussed further below.

Automated Cropping in Synchronized Content Management Systems

Processes for automated cropping of images can be implemented using synchronized CMSs. The distributed nature of a synchronized CMS enables various operations to be distributed amongst a number of computing devices. While the synchronized CMS is primarily responsible for sharing content between authorized computing devices, the synchronized CMS can also perform processes including automated processes for determining crop locations and/or dimensions with respect to images being shared by the synchronized CMS. Accordingly, the synchronized CMS can be responsible for passing image files and/or cropped image metadata between authorized computing devices. In many embodiments, the synchronized CMS can initially share cropped image metadata (including a cropped thumbnail image) and share the full image file upon request by a specific authorized computing device. In a number of embodiments, the synchronized CMS can also be responsible for generating cropped image metadata.

Figure 5:
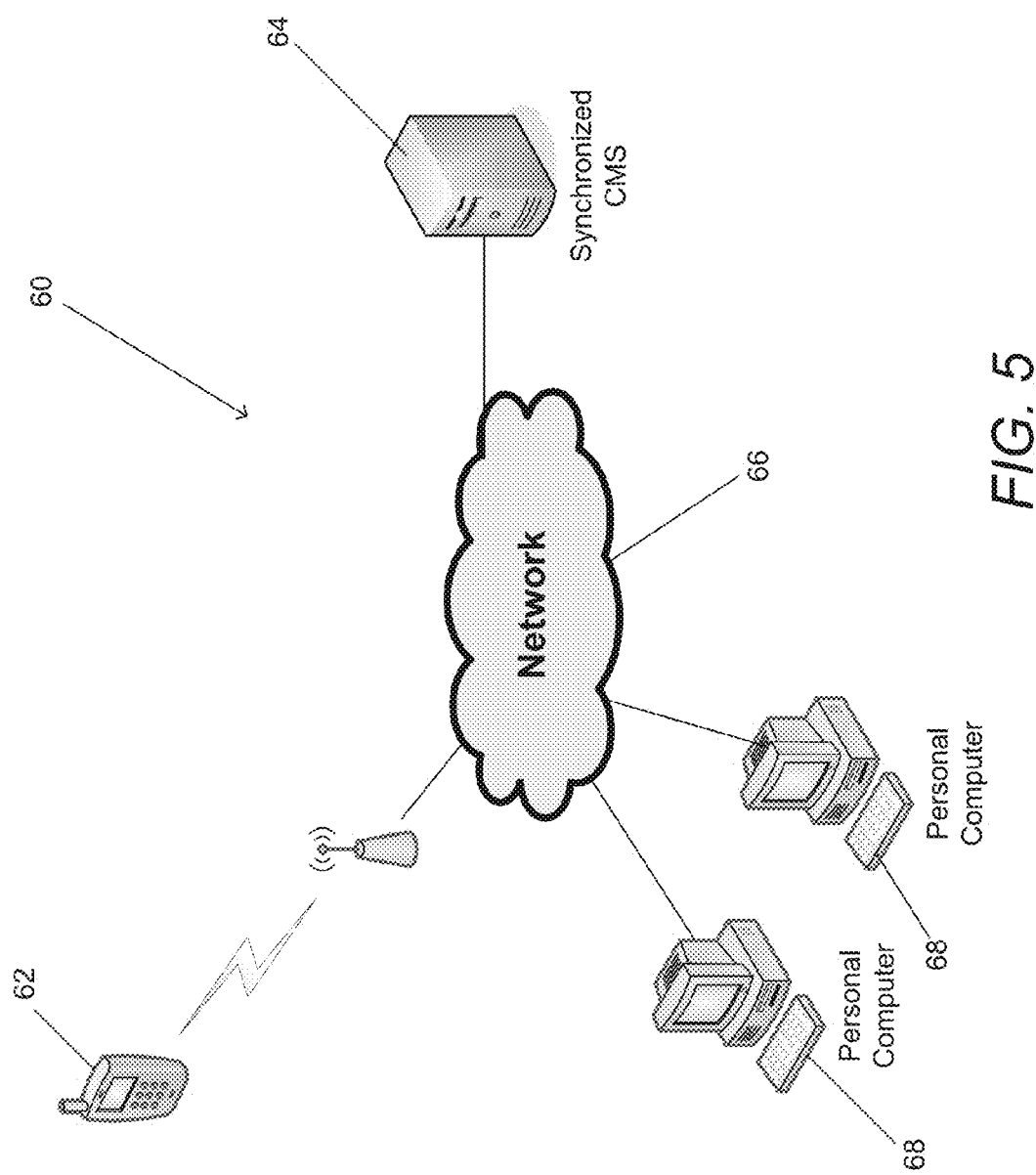
FIG. 5 is a network diagram showing a content distribution network that can be utilized to share image data and image cropping metadata via a synchronized content management system (CMS) in accordance with an embodiment of the invention.

Computing devices configured to utilize a synchronized CMS to share image files and cropped image metadata in accordance with an embodiment of the invention are illustrated in FIG. 5. Content distribution network 60 includes image capture device 62, which in the illustrated embodiment is a mobile computing device. Image capture device 62 is configured via a client application to communicate with synchronized CMS 64 via a network 66. In many instances, the network can be a network of networks such as (but not limited to) the Internet. As is discussed further below, image capture device 62 can share captured images with synchronized CMS 64 and one or both of image capture device 62 and synchronized CMS 64 can be configured to perform an automated cropping process in accordance with embodiments of the invention to generate cropped image metadata that can be distributed to other computing devices 68 such as (but not limited to) personal computers, laptop computers, tablet computers, mobile computing devices, network connected televisions, network connected set top boxes, network connected media players and/or any other form of consumer electronics device that is capable of receiving image files via a network connection and decoding encoded images contained within the image files for display.

Figure 6:
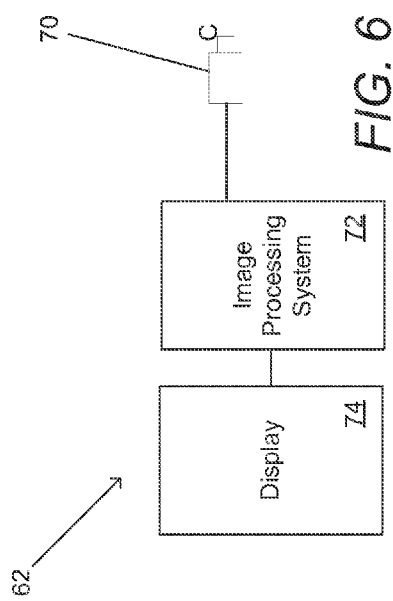
FIG. 6 is a block diagram that conceptually illustrates an image capture device configured to automatically crop captured images based upon the location of regions of interest (ROIs) within the images in accordance with an embodiment of the invention.

An image capture device that can be utilized to capture images and automatically generate cropped image metadata with respect to the captured images in accordance with an embodiment of the invention is illustrated in FIG. 6. Image capture device 62 includes at least one camera 70, image processing system 72, and display 74. Camera 70 is utilized to acquire image data that can be processed by image processing system 72 for display. Images captured by image processing system 72 using image data received from camera 70 can be written to image files that can be shared with other computing devices via a synchronized CMS, such as the synchronized CMS described above with reference to FIG. 5. The image processing system can also automatically process captured images to identify a crop location and/or the dimensions of a cropped image. The crop location and/or dimensions of the cropped image can be utilized to generate cropped image metadata that can also be shared via the synchronized CMS.

Figure 7:
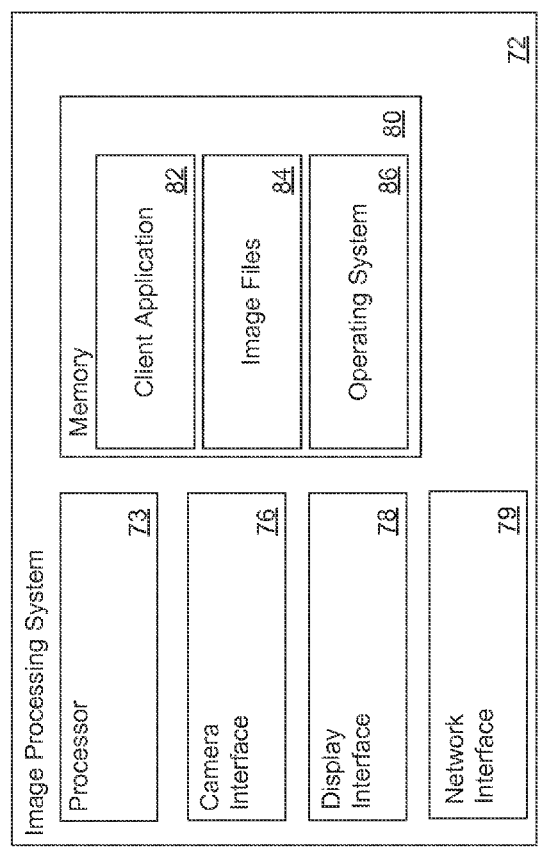
FIG. 7 is a block diagram that conceptually illustrates an image processing system configured to automatically crop images based upon the locations of regions of interest (ROIs) within the images in accordance with an embodiment of the invention.

An image processing system that can be utilized to automatically process captured images to generate cropped image metadata in accordance with an embodiment of the invention is illustrated in FIG. 7. Image processing system 72 includes processor 73, camera interface 76, display interface 78, network interface 79 and memory 80. Memory 80 contains client application 82, image files 84, and operating system 86. In many embodiments, client application 82 configures processor 73 to synchronize image files with other computing devices via a synchronized CMS using network interface 79. Client application 82 can also incorporate an image cropping application that configures processor 73 to analyze one or more of image files 84 to determine cropped image metadata using a process involving performing object detection to identify ROIs and convolving the ROIs with one or more cropping kernels. Client application 82 configures processor 73 to share cropped image metadata generated by client application 82 with other computing devices via a synchronized CMS using network interface 79.

Although the image processing system described above with respect to FIG. 7 is discussed in the context of an image capture system, computing hardware that does not include a camera interface and/or a display interface can be configured by an image cropping application to analyze image files to determine cropped image metadata using a process involving performing object detection to identify ROIs and weighting the ROIs based upon their positions within candidate crops. Furthermore, similar computing hardware to that described above with reference to FIG. 7 (camera interface 76 and display interface 78 optional) can be utilized in a synchronized CMS server system to implement a synchronized CMS that includes a processor configured by an image cropping application (incorporated within a server application) to analyze image files shared via computing devices to determine cropped image metadata using a process involving performing object detection to identify ROIs and weighting the ROIs based upon their positions within candidate crops. In a similar manner to that outlined above, the synchronized CMS can be configured by a content sharing application to provide the generated cropped image metadata to computing devices that receive the shared image files.

Although specific architectures for synchronized CMSs, image capture devices, and image processing systems are described above with reference to FIGS. 5-7, any of a variety of synchronized CMSs, and computing devices appropriate to the requirements of specific applications can be configured by image cropping applications to automatically crop images in accordance with embodiments of the invention. The manner in which computing devices and synchronized CMSs communicate to distribute image files and/or cropped image metadata in accordance with embodiments of the invention is discussed further below.

Distribution of Cropped Image Metadata Using a Synchronized CMS

Figure 8:
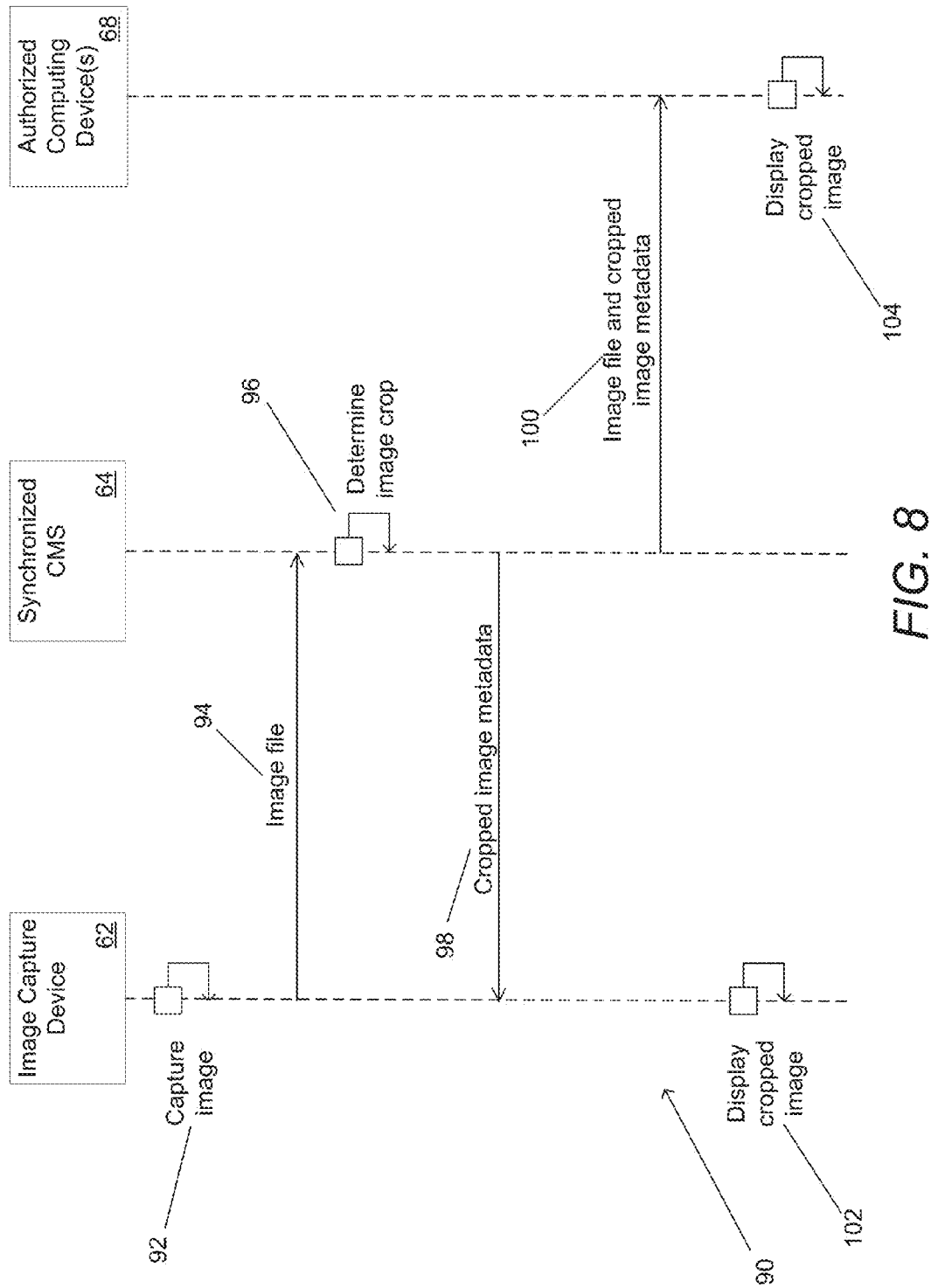
FIG. 8 is a communication diagram showing the communication of images captured by an image capture device to a synchronized CMS, which is configured to automatically generate cropped image metadata for received images based upon the locations of regions of interest (ROIs) within the images, and distribution of the received images and/or cropped image metadata to authorized computing devices by the synchronized CMS in accordance with an embodiment of the invention.

Cropped image metadata can be generated in a variety of locations within a content distribution network. A process for distributing image files captured by image capture devices and cropped image metadata generated by a synchronized CMS in accordance with an embodiment of the invention is illustrated in FIG. 8. In the illustrated process 90, image capture device 62 captures (92) an image and writes image data to image file 94. Image file 94 is provided to synchronized CMS 64. Synchronized CMS 64 determines (96) a crop location and/or the dimensions of the image crop. The crop location and dimensions of the image crop can be utilized to generate cropped image metadata. The cropped image metadata can include (but is not limited to) the cropped image, the crop location, and/or the dimensions of the cropped image. Synchronized CMS 64 provides a copy of the cropped image metadata 98 to image capture device 62 and provides copies of image file 94 and cropped image metadata 100 to additional authorized computing device(s) 68. In many embodiments, the synchronized CMS maintains a list of computing devices with permissions to access shared files and the synchronized CMS pushes the shared files and cropped image metadata to all authorized computing devices with which the synchronized CMS can establish a network connection. Image file 94 and cropped image metadata 98 (collectively 100) can be utilized within a user interface generated by image capture device 62 or authorized computing device 68 to display a cropped image 104. In embodiments where cropped image metadata 98 includes a cropped image generated from captured image 92, the cropped image can be displayed 102. In embodiments where cropped image metadata 98 includes a crop location and/or the dimensions of the image crop, image capture device 62 and/or authorized computing device 68 can generate a cropped image from the image contained within image file 94 using the crop location and/or the dimensions of the image crop. In several embodiments, cropped image metadata 98 can include multiple sets of crop locations and/or image crop dimensions and image capture device 62 and/or authorized computing device 68 can select a crop location and/or image crop dimensions that are appropriate for display of the cropped image within a particular user interface.

The generation of cropped image metadata can also be performed by the image capture device. In many instances, the image capture device automatically generates the cropped image metadata and shares the cropped image data with the associated image files via a synchronized CMS. In other instances, the image capture device is intermittently connected to the synchronized CMS and only generates the cropped image metadata when the synchronized CMS is unavailable.

Figure 9:
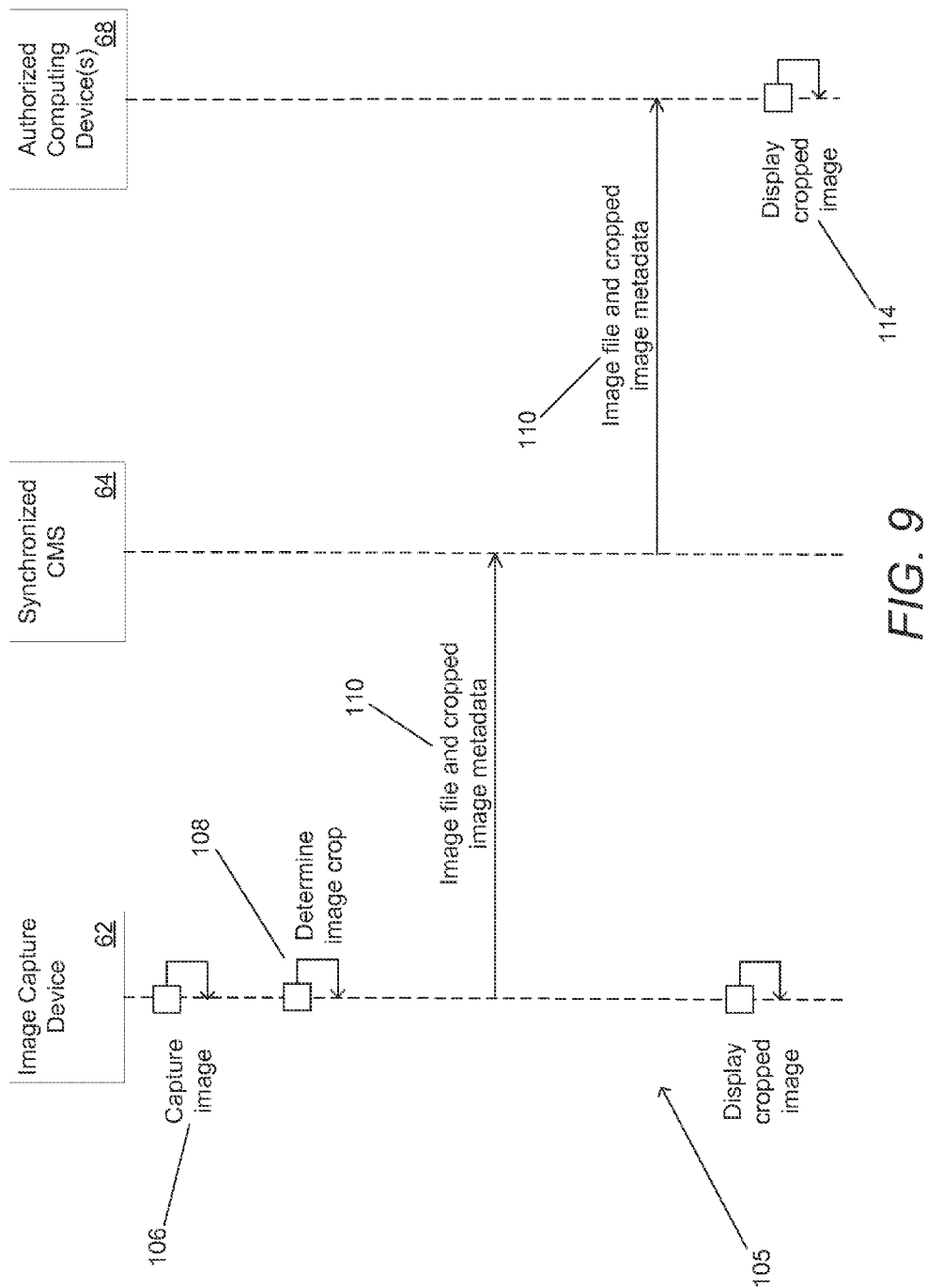
FIG. 9 is a communication diagram showing the communication of image data and associated cropped image metadata to a synchronized CMS, which is configured to distribute the image data and associated cropped image metadata to authorized computing devices, in accordance with an embodiment of the invention.

A process for distributing image files captured by image capture devices and cropped image metadata generated with respect to the image files by the image captures devices in accordance with an embodiment of the invention is illustrated in FIG. 9. In the illustrated process 105, image capture device 62 captures (106) an image and writes image data to image file. Image capture device 62 also determines (108) a crop location and/or the dimensions of the image crop. The crop location and dimensions of the image crop can be utilized to generate cropped image metadata. The cropped image metadata can include (but is not limited to) the cropped image, the crop location, and/or the dimensions of the cropped image. Image file and cropped image metadata 110 are provided to synchronized CMS 64. Synchronized CMS 64 provides copies of image file and cropped image metadata 110 to authorized computing device(s) 68 in the manner outlined above. In embodiments where the cropped image metadata includes a cropped image generated from captured image 106, authorized computing device 68 can display cropped image as part of a user interface 114. In embodiments where the cropped image metadata includes a crop location and/or the dimensions of the image crop, authorized computing device 68 can generate a cropped image from the image contained within the image file using the crop location and/or the dimensions of the image crop. In several embodiments, the cropped image metadata can include multiple sets of crop locations and/or image crop dimensions and authorized computing device 68 can select a crop location and/or image crop dimensions that are appropriate for display of the cropped image within a particular user interface.

Although specific processes for capturing image files and generating cropped image metadata for distribution via a synchronized CMS are described above with reference to FIGS. 8 and 9, any of a variety of processes involving the generation of cropped image metadata by identifying ROIs within captured images and determining crop location and/or the dimensions of a cropped image by weighting the ROIs based upon the locations of the ROIs relative to the crop location can be utilized in accordance with embodiments of the inventions. Specific processes for identifying ROIs and for convolving identified ROIs with cropping kernels in accordance with embodiments of the invention are discussed further below.

Identifying ROIs

A number of object detection techniques exist that enable the detection of objects within images. Many embodiments of the invention use a cascade of classifiers based approach to object detection in which a decision tree of weak classifiers trained to detect a specific type of object (e.g. faces) is applied in stages to different regions within an image until the candidate region is rejected or all of the stages are passed. The use of a cascade of classifiers based approach to detect faces is disclosed in P. Viola, M. Jones, *Robust Real-Time Face Detection*, IJCV 2004, In other embodiments, any of a variety of object detection techniques can be utilized including other feature based approaches, template matching approaches, bag-of-words models and/or any other of a variety of techniques appropriate to the requirements of a specific application.

In several embodiments, the process utilized to generate cropped image metadata incorporates a cascade of classifiers that are applied to one or more image data channels including (but not limited to) image gradient magnitude, image gradient orientation, LUV color channels, a greyscale color channel, a dense depth map, a focus map, an image segmentation map and/or a saliency map. In a number of embodiments, a parts based approach is utilized in which a number of cascades of classifiers are applied to identify different parts of a human face within an image and then a flock of features based approach is used to determine whether the detected features combine to form a human face. When object detection is performed on images captured by a specific image capture device, the object detection process can be simplified based upon the assumption that all of the images were captured by the camera of the image capture device. When object detection is performed by a synchronized CMS, the same assumption cannot be used and an object detection process is utilized that is robust to variations in the optical systems and sensor characteristics of the cameras used to capture the images shared via the synchronized CMS.

Many object detection processes provide one or more confidence metrics that describe the reliability of an object detection. As is discussed further below, the confidence metrics can be used to filter the ROIs that are considered when cropping an image and/or can be utilized to weight ROIs convolved with cropping kernels utilized to identify a crop location and/or the dimensions of the cropped image. In several embodiments, different object detectors and/or cascades of classifiers applied to different image data channels produce different confidence metrics. The confidence metrics can be rescaled to a common scale and the rescaled confidence metrics utilized to select a crop location and/or the dimensions of the cropped image.

Figure 10:
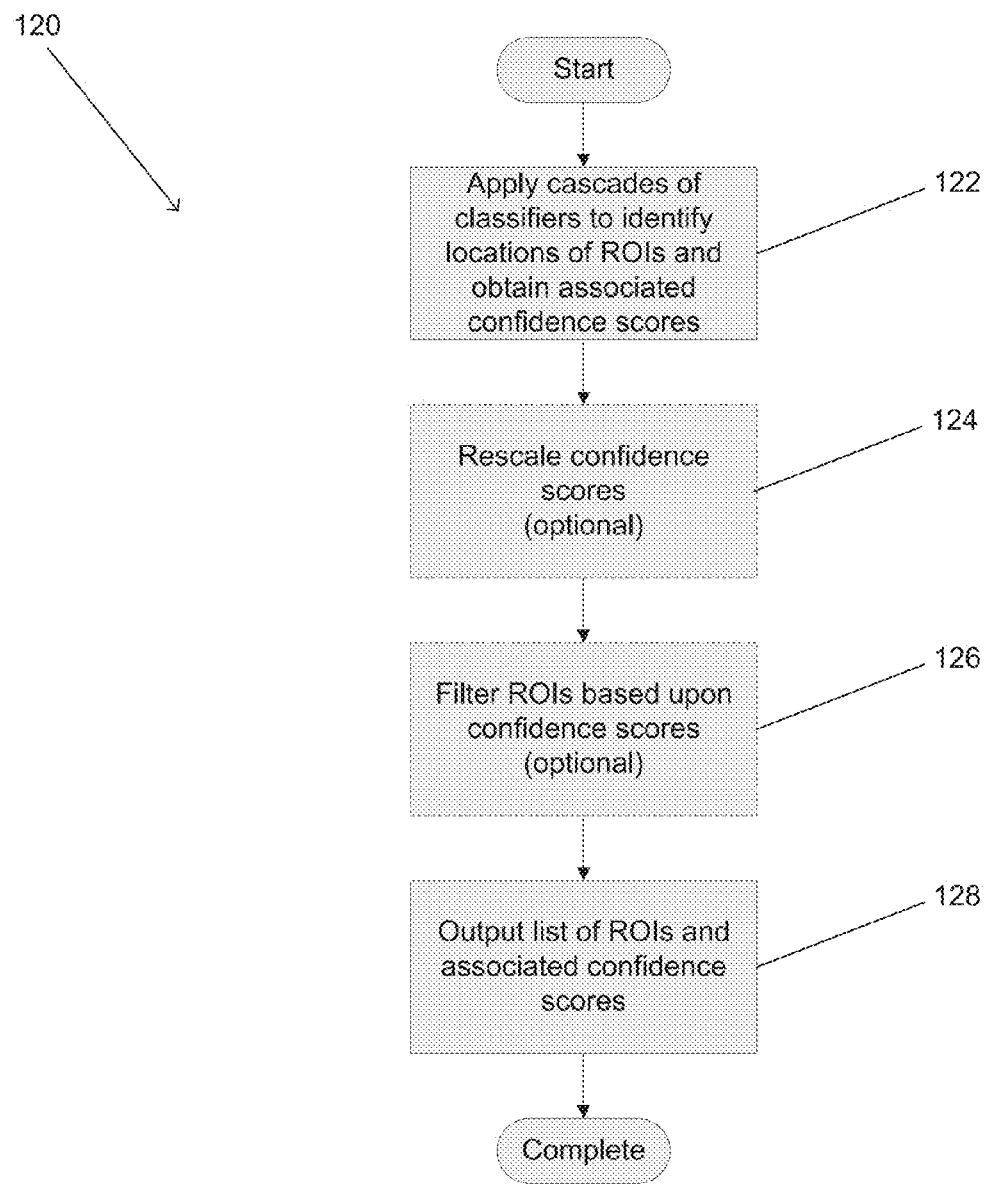
FIG. 10 is a flow chart showing a process for identifying ROIs within an image in accordance with an embodiment of the invention.

A process for identifying objects within an image in accordance with an embodiment of the invention is illustrated in FIG. 10. Process 120 includes applying (122) cascades of classifiers to identify the locations of ROIs and to obtain associated confidence scores. The confidence scores can be optionally rescaled (124). The (rescaled) confidence scores can be optionally utilized to filter (126) ROIs from the list of ROIs considered when selecting a crop location and/or the dimensions of the cropped image. Process 120 outputs (128) a (filtered) list of ROIs and their associated confidence scores. In some embodiments, each ROI describes the location of a group of pixels within the image. The ROIs can be specified as rectangles, polygons, and/or lists of pixels that form the ROI.

Although specific processes are described above with reference to FIG. 10, any of a variety of processes for performing object detection and outputting a list of ROIs and associated confidence scores can be utilized as appropriate to the requirements of specific applications in accordance with embodiments of the invention including processes that utilize any of the other object detection techniques described above and/or use different object detection techniques to identify different types of objects. Furthermore, the various processes described above with reference to FIG. 10 can be performed in alternative sequences and/or in parallel (on different computing devices) in order to achieve similar results in a manner that is more appropriate to the requirements of a specific application. In a number of embodiments, the process of detecting objects within an image is capable of detecting different types of objects and the list of ROIs output by the object detection process includes associated confidence metrics and/or associated importance weightings. As can be readily appreciated, any of a variety of techniques can be utilized to generate the importance weightings associated with an ROI including hand tuning the importance weightings that are assigned to different objects and/or using machine learning techniques that determine the importance weighting assigned to a specific object based upon a variety of image data channels and/or including information such as (but not limited to) the location of the ROI within the image other types of ROIs present within the image, and/or the clustering of ROIs within the image. Processes for selecting crop locations and/or the dimensions of cropped images utilizing lists of ROIs within an image are discussed further below.

Convolving ROIs with Cropping Kernels

Processes for selecting a crop location and/or the dimensions of a cropped image in accordance with many embodiments of the invention involve the use of a cropping kernel to weight ROIs based upon their location relative to a crop location. In several embodiments, a predetermined cropping kernel is utilized. In a number of embodiments, a variety of cropping kernels applying different weights and/or having different dimensions can be utilized. In certain embodiments, cropping kernels are utilized that weight ROIs proximate the center of a cropped image more highly than ROIs proximate the edges of a cropped image. Examples of appropriate cropping kernels include (but are not limited to) conical (i.e. linear), parabolic, or Gaussian cropping kernels. The individual cropping kernel(s) that are utilized typically depend upon the requirements of a specific application. In several embodiments, the convolution of the ROIs with the cropping kernel also involves weighting the ROIs by additional factors including (scaled) confidence metrics and/or importance weightings.

Figure 11:
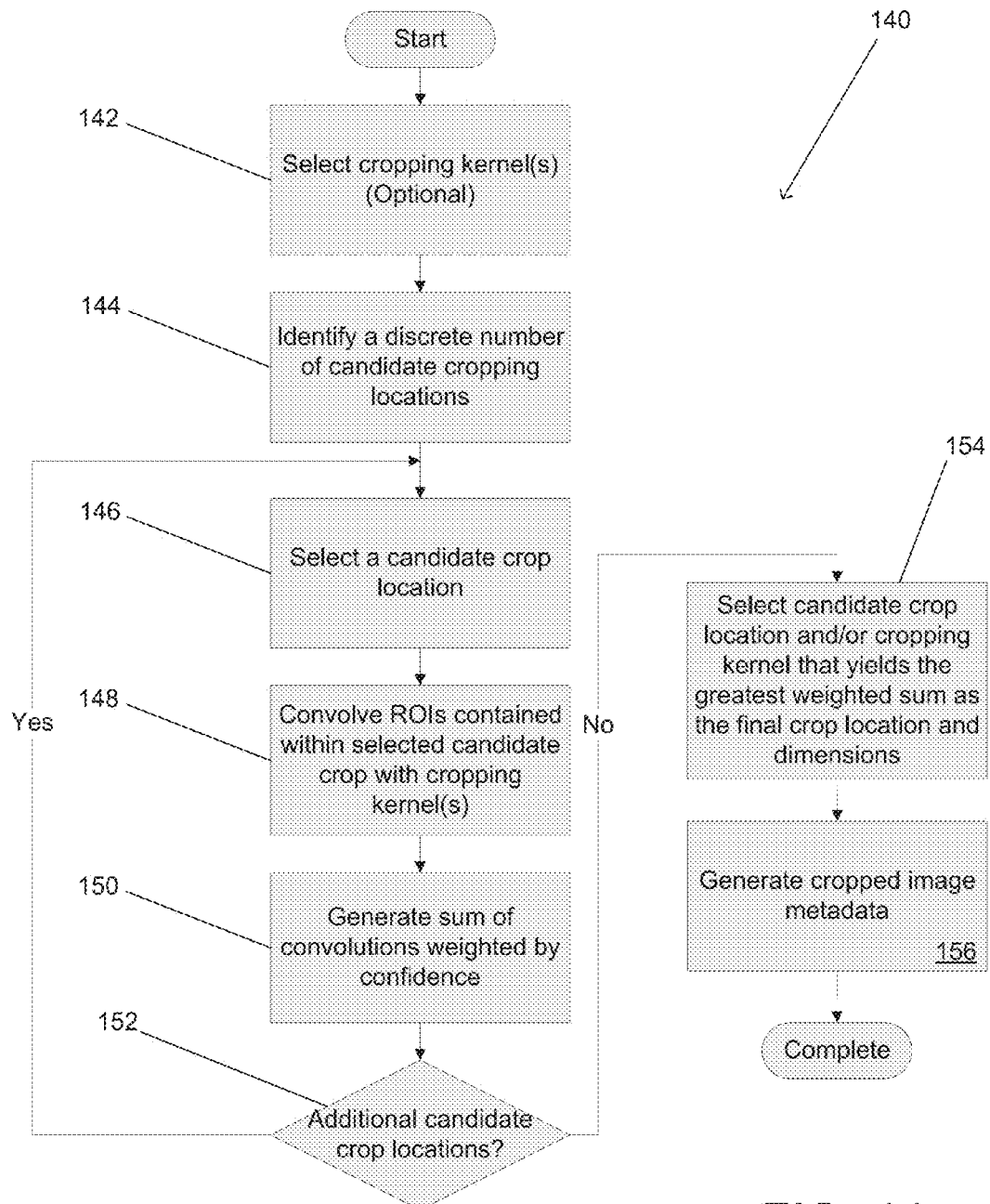
FIG. 11 is a flow chart showing a process for identifying a crop location by convolving one or more cropping kernels with regions of interest in candidate crop locations in accordance with an embodiment of the invention.

A process for selecting a crop location and/or the dimensions of a cropped image by convolving a list of ROIs within the image with one or more cropping kernels in accordance with an embodiment of the invention is illustrated in FIG. 11. Process 140 (optionally) includes selecting one or more cropping kernels 142 that can then be utilized to select a crop location and/or the dimensions of a cropped image. In several embodiments, the cropping kernel is selected based upon the number, location, and/or type of ROIs detected within the image. In many embodiments, a predetermined cropping kernel is utilized.

Process 140 includes identifying (144) a discrete number of candidate crop locations. A candidate crop location is selected (146) and one or more cropping kernels are convolved with the ROIs (148) contained within the candidate crop defined relative to the candidate crop location by each of the one or more cropping kernels. As noted above, a single predetermined cropping kernel may be utilized. Alternatively, a set of cropping kernels having different dimensions can be utilized to determine the dimensions of the cropped image and/or a set of cropping kernels having the same dimensions and utilizing different kernel functions can be utilized that may result in the selection of different crop locations based upon different compositions of visual features (e.g. different kernels may yield higher outputs in the presence of a cluster of an odd number of ROIs compared to a cluster of an even number of ROIs or vice versa). In the illustrated embodiment, process 140 involves generating (150) a weighted sum by convolving each of the ROIs with the cropping kernel and weighting the result by the (scaled) confidence score of the ROI. In other embodiments, the result of each convolution can be weighted by any of a variety of factors including (but not limited to) by the application of an importance weighting.

Process 140 determines (152) whether all candidate crop locations and cropping kernels have been searched. When all candidate crop locations and cropping kernels have been searched, the process selects (154) the candidate crop location that yields the greatest weighted sum as the final crop location. In embodiments where more than one cropping kernel is considered and the cropping kernels have different dimensions, the dimensions of the cropping kernel that yield the highest weighted sum are selected as the dimensions of the cropped image. In a number of embodiments, the process outputs cropped metadata for multiple image crops. In this way, the cropped image metadata can enable the display of different cropped images having different aspect ratios. The crop location and the dimensions of the cropping kernel can then be utilized to generate (156) cropped image metadata including (but not limited to) any one or more of the cropped image, the crop location, and/or the dimensions of the cropped image.

Although specific processes are described above with reference to FIG. 11, any of a variety of process for selecting a crop location and/or the dimensions of a cropped image based upon information concerning ROIs within the image and/or metadata describing the regions of interest including (but not limited to) confidence metrics and/or importance weightings can be utilized as appropriate to the requirements of specific applications in accordance with embodiments of the invention. Furthermore, the various processes described above with reference to FIG. 11 can be performed in alternative sequences and/or in parallel (on different computing devices) in order to achieve similar results in a manner that is more appropriate to the requirements of a specific application.

Constraining Crop Location Searches in One Dimension

While much of the above discussion describes performing a general search in two dimensions of candidate crop locations, the speed with which a desired crop location can be identified may be increased by selecting the size of a candidate crop to be equal to the smallest dimension of the captured image. Utilizing the smallest dimension and a desired aspect ratio, a search can be performed along a single dimension within the image.

Figure 12:
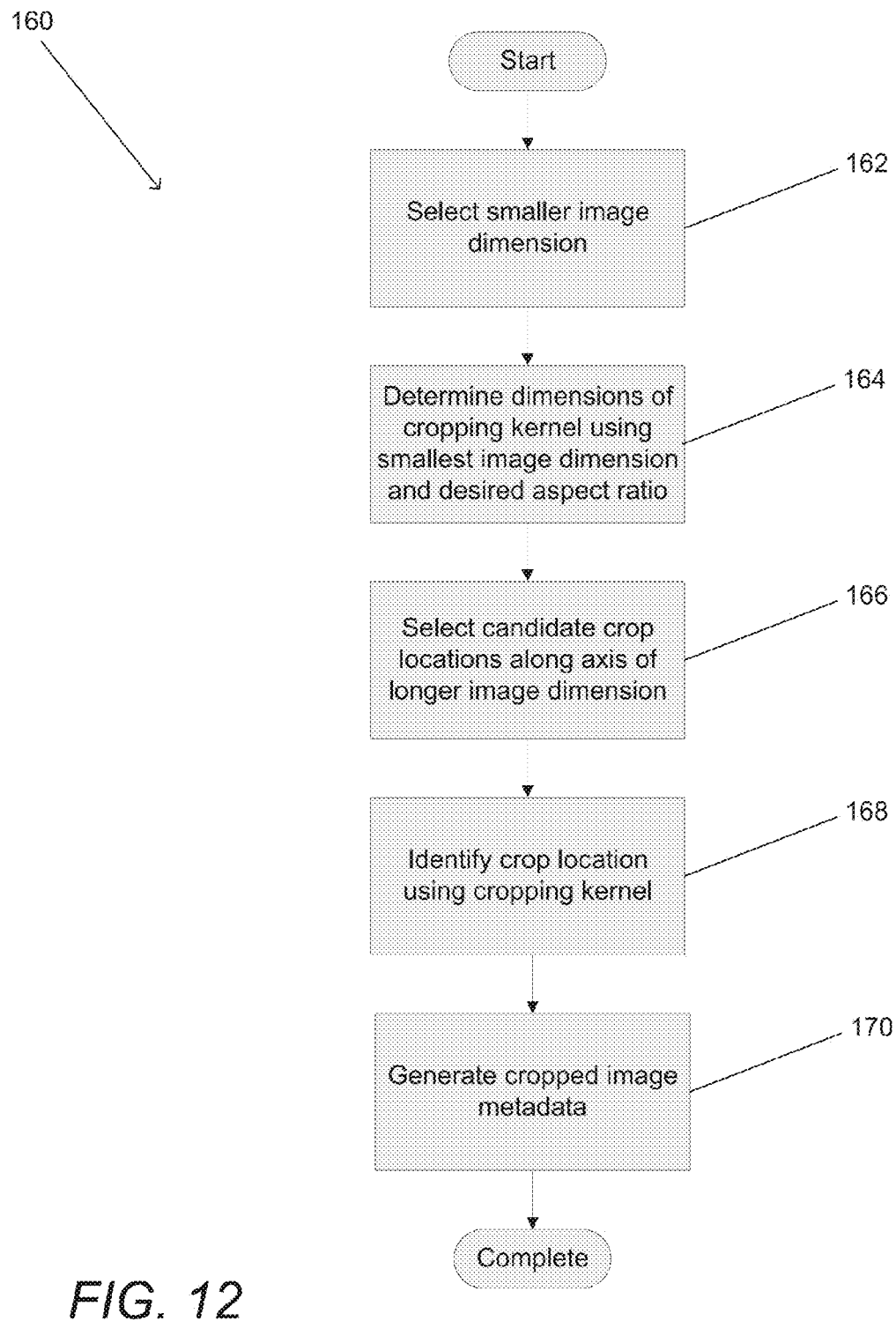
FIG. 12 is a flow chart showing a process for selecting the largest cropping kernel having a desired aspect ratio that can be utilized to crop a given image and then searching candidate crop locations within the given image using the cropping kernel in accordance with an embodiment of the invention.

A process for selecting the largest cropping kernel that can be utilized to crop an image to yield a cropped image with a desired aspect ratio and then searching candidate crop locations using the cropping kernel in accordance with an embodiment of the invention is illustrated in FIG. 12. Process 160 includes selecting (162) the smaller of the two image dimensions and determining (164) dimensions of a cropping kernel having one dimension equal to the smaller of the two image dimensions and the other dimension selected to satisfy a desired aspect ratio. Candidate crop locations can be selected (166) along an axis defined by the longer of the two image dimensions and a convolution process similar to the convolution processes described above with respect to FIG. 11 can be applied at the candidate crop locations to identify (168) a crop location. The crop location and the dimensions of the cropping kernel can then be utilized to generate (170) cropped image metadata including (but not limited to) any one or more of the cropped image, the crop location, and/or the dimensions of the cropped image.

Although specific processes are described above with reference to FIG. 12, any of a variety of process that enable the efficient searching of an image to locate a crop location by weighting ROIs by factors including their positions within candidate cropped images can be utilized in accordance with embodiments of the invention. Furthermore, the various processes described above with reference to FIG. 12 can be performed in alternative sequences and/or in parallel (on different computing devices) in order to achieve similar results in a manner that is more appropriate to the requirements of a specific application.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. An image processing system, comprising:
a processor; and
a memory connected to the processor, where the memory contains:
an image cropping application; and
an image file containing image data encoding an original image;
wherein the image cropping application directs the processor to:
utilize at least one object detector to identify at least one region of interest within the original image;
select a plurality of candidate cropped images within the original image;
for each candidate cropped image, generate an output by weighting each of the at least one region of interest contained within the candidate cropped image as a function of its position within the candidate cropped image, where
weighting each of the at least one region of interest comprises convolving each of a plurality of cropping kernels positioned in a candidate crop location with the at least one region of interest contained within the candidate cropped image to generate a plurality of outputs with respect to the candidate cropped image; and
the plurality of cropping kernels weight a given region of interest as a function of its position within the candidate cropped image using different weighting functions;
select a crop location within the original image based upon the candidate cropped image having the largest output; and
generate cropped image metadata.

2. The image processing system of claim 1, wherein the image cropping application further directs the processor to utilize the at least one object detector to obtain at least one confidence metric associated with each of the at least one region of interest.

3. The image processing system of claim 2, wherein the image cropping application further directs the processor to filter the at least one region of interest identified by the at least one object detector based upon the at least one confidence metric.

4. The image processing system of claim 3, wherein the image cropping application further directs the processor to convolve a cropping kernel positioned in a candidate crop location with the at least one region of interest contained within the candidate cropped image by weighting the convolution of the cropping kernel with a given region of interest by the at least one confidence metric associated with the given region of interest.

5. The image processing system of claim 2, wherein the image cropping application further directs the processor to rescale the at least one confidence metric associated with each of the at least one region of interest.

6. The image processing system of claim 1, wherein the image cropping application further directs the processor to select a subset of a plurality of cropping kernels based upon the at least one region of interest identified within the image.

7. The image processing system of claim 1, wherein:
at least two of the candidate cropped images have different dimensions; and
the image cropping application further directs the processor to select the dimensions of the candidate cropped image that results in the largest output as the dimensions of a cropped image.

8. The image processing system of claim 1, wherein the cropped image metadata comprises an image crop location.

9. The image processing system of claim 8, wherein the cropped image metadata further comprises cropped image dimensions.

10. The image processing system of claim 1, wherein:
the image cropping application further directs the processor to generate a cropped image from the original image based upon the crop location and dimensions of a cropping kernel; and
the cropped image metadata comprises the cropped image.

11. The image processing system of claim 1, wherein the image cropping application further directs the processor to insert the cropped image metadata inside the image file.

12. The image processing system of claim 1, wherein:
the image processing system is part of an image capture device that further comprises a camera and a network interface; and
the image cropping application is part of a client application that directs the processor to share the image file and the cropped image metadata with a synchronized content management system via the network interface.

13. The image processing system of claim 1, wherein:
the image processing system is part of a synchronized content management system further comprising a network interface; and
the image cropping application is part of a server application that directs the processor to automatically share at least one of the image file and the cropped image metadata with at least one authorized computing device via the network interface.

14. The image processing system of claim 1, wherein the image cropping application further directs the processor to utilize at least one object detector to obtain at least one importance weighting associated with each of the at least one region of interest.

15. The image processing system of claim 14, wherein the convolution of one of the plurality of cropping kernels with a given region of interest is weighted by the at least one importance weighting associated with the given region of interest.

16. The image processing system of claim 1, wherein:
the image cropping application further directs the processor to:
utilize at least one object detector to obtain at least one confidence metric associated with each of the at least one region of interest;
rescale the at least one confidence metric associated with each of the at least one region of interest; and
filter the at least one region of interest identified by the at least one object detector based upon the rescaled at least one confidence metric; and the convolution of one of the plurality of cropping kernels with a given region of interest is weighted by the rescaled at least one confidence metric associated with the given region of interest; and
the cropped image metadata is selected from the group consisting of:
an image crop location;
cropped image dimensions; and
a cropped image.

17. The image processing system of claim 1, wherein the image cropping application further directs the processor to:
utilize the at least one object detector to obtain at least one confidence metric associated with each of the at least one region of interest; and
weight each of the at least one region of interest contained within a candidate cropped image as a function of its position within the candidate cropped image by further weighting a given region of interest from the at least one region of interest by the at least one confidence metric associated with the given region of interest.

18. A method of generating cropped image metadata from an image, comprising:
- identifying at least one region of interest within an image using a processor directed by an image cropping application;
- selecting a plurality of candidate cropped images within the image using the processor directed by the image cropping application;
- for each candidate cropped image, generating an output by weighting each of the at least one region of interest contained within the candidate cropped image as a function of its position within the candidate cropped image using the processor directed by the image cropping application, where:
  - weighting each of the at least one region of interest comprises convolving each of a plurality of cropping kernels positioned in a candidate crop location with the at least one region of interest contained within the candidate cropped image to generate a plurality of outputs with respect to the candidate cropped image; and
  - the plurality of cropping kernels weight a given region of interest as a function of its position within the candidate cropped image using different weighting functions;
- selecting a crop location within the image based upon the candidate cropped image having the largest output using the processor directed by the image cropping application; and
- generating cropped image metadata using the processor directed by the image cropping application.

19. A method of sharing images and cropped image metadata between authorized computing devices using a synchronized content management system (CMS) in accordance with an embodiment of the invention, comprising:
- receiving an image file containing image data encoding an original image from an authorized computing device at a synchronized CMS server system;
- storing the received image file within the synchronized CMS server system;
- identifying at least one region of interest within the original image using a processor within the synchronized CMS server system directed by an image cropping application;
- selecting a plurality of candidate cropped images within the original image using a processor within the synchronized CMS server system directed by an image cropping application;
- for each candidate cropped image, generating an output by weighting each of the at least one region of interest contained within the candidate cropped image as a function of its position within the candidate cropped image using a processor within the synchronized CMS server system directed by an image cropping, where:
  - weighting each of the at least one region of interest comprises convolving each of a plurality of cropping kernels positioned in a candidate crop location with the at least one region of interest contained within the candidate cropped image to generate a plurality of outputs with respect to the candidate cropped image; and
  - the plurality of cropping kernels weight a given region of interest as a function of its position within the candidate cropped image using different weighting functions
- selecting a crop location within the original image based upon the candidate cropped image having the largest output using a processor within the synchronized CMS server system directed by an image cropping application; and
- generating cropped image metadata using a processor within the synchronized CMS server system configured by an image cropping application; and
- sharing the image file and cropped image meta data with at least one authorized computing device using a processor within the synchronized CMS server system directed by a content sharing application.

* * * * *